United States Patent
Lu et al.

(10) Patent No.: US 7,779,191 B2
(45) Date of Patent: Aug. 17, 2010

(54) PLATFORM-BASED IDLE-TIME PROCESSING

(75) Inventors: Chien-Ping Lu, Cupertino, CA (US); Stephen D. Lew, Sunnyvale, CA (US); Robert William Chapman, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 65 days.

(21) Appl. No.: 12/182,074

(22) Filed: Jul. 29, 2008

(65) Prior Publication Data

US 2010/0031071 A1 Feb. 4, 2010

(51) Int. Cl.
G06F 9/48 (2006.01)

(52) U.S. Cl. .................. 710/262; 710/260; 710/267; 713/324

(58) Field of Classification Search ......... 710/260–262, 710/267; 713/300, 320, 323, 324
See application file for complete search history.

(56) References Cited

U.S. PATENT DOCUMENTS

| | | | |
|---|---|---|---|
| 6,105,142 A * | 8/2000 | Goff et al. .................. 713/324 |
| 6,711,691 B1 * | 3/2004 | Howard et al. .............. 713/300 |
| 6,986,066 B2 * | 1/2006 | Morrow et al. .............. 713/320 |
| 7,330,926 B2 * | 2/2008 | Ho .............................. 710/311 |
| 7,363,411 B2 * | 4/2008 | Kobayashi et al. .......... 710/261 |
| 7,624,215 B2 * | 11/2009 | Axford et al. ............... 710/260 |
| 2004/0225790 A1 * | 11/2004 | George et al. ............... 710/260 |
| 2007/0079161 A1 * | 4/2007 | Gupta ......................... 713/324 |
| 2007/0143514 A1 * | 6/2007 | Kaushik et al. ............. 710/260 |
| 2009/0172423 A1 * | 7/2009 | Song et al. .................. 713/300 |

\* cited by examiner

Primary Examiner—Glenn A Auve
(74) Attorney, Agent, or Firm—Patterson & Sheridan, LLP

(57) ABSTRACT

A system and method for transitions a computing system between operating modes that have different power consumption characteristics. When a system management unit (SMU) determines that the computing system is in a low activity state, the SMU transitions the central processing unit (CPU) into a low power operating mode after the CPU stores critical operating state of the CPU in a memory. The SMU then intercepts and processes interrupts intended for the CPU, modifying a copy of the critical operating state. This effectively extends the time during which the CPU stays in lower power mode. When the SMU determines that the computing system exits a low activity state, the copy of the critical operating state is stored in the memory and the SMU transitions the CPU into a high power operating mode using the modified critical operating state.

20 Claims, 10 Drawing Sheets

PLATFORM-BASED IDLE-TIME PROCESSING

FIELD OF THE INVENTION

Embodiments of the present invention relate generally to reducing the power consumption of a mobile computing platform, and more specifically to dynamically process interrupts in the core logic while keeping the central processing unit (CPU) in the computing platform powered off.

DESCRIPTION OF THE RELATED ART

Conventionally, a central processing unit (CPU) is used to process interrupts even when there is little or no activity. Therefore, a good portion of the CPU and the front side bus remain powered up and continues to consume power even when the activity level is very low during idle. The interrupts may result from a movement of an input device such as a mouse, display updates, or an update of a system clock.

Accordingly, what is needed in the art is a system and method for adaptively keep the CPU, and the front side bus powered off longer and more frequently reduce the power consumption of a computing system when there is little or no system activity.

SUMMARY OF THE INVENTION

A system and method for transitioning a computing system between operating modes that have different power consumption characteristics effectively extends the CPU idle time to reduce the power consumption. The computing system is transitioned to a low power operating mode when the computing system is in a low activity state. In the low activity state a system management unit (SMU) intercepts and processes interrupts intended for the CPU. The SMU stores a copy of critical operating state that is modified as needed during the processing of the interrupts. When the level of activity changes, the SMU transitions the computing system from the low power operating mode to the high power operating mode by storing the copy of the critical operating state in memory and updating the critical operating state that was stored by the CPU. The CPU then resumes processing of the interrupt using the copy of the critical operating state.

Various embodiments of a method of the invention for adaptively transitioning a computing system between operating modes that have different power consumption include determining that the computing system is in a low activity state and initiating a system management interrupt (SMI) to a central processing unit (CPU) in the computing system. Critical operating state of the CPU is then stored in a system memory and the CPU is configured to operating in a low power operating mode. A system management unit (SMU) intercepts and processes interrupts intended for the CPU.

Various embodiments of the invention include a computing system that is configured to adaptively transition between operating modes that have different power consumption. The computing device includes a central processing unit (CPU) configurable to operate in a low power operating mode and a high power operating mode, a local memory configured to store critical operating state, and a core logic that includes a system management unit (SMU) capable of processing interrupts on behalf of the CPU. The SMU is configured to initiate a system management interrupt to the CPU when the computing system is in a low activity state, store the critical operating state of the CPU in the system memory, configure the CPU in the low power operating mode, and intercept interrupts intended for the CPU for processing.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1A:
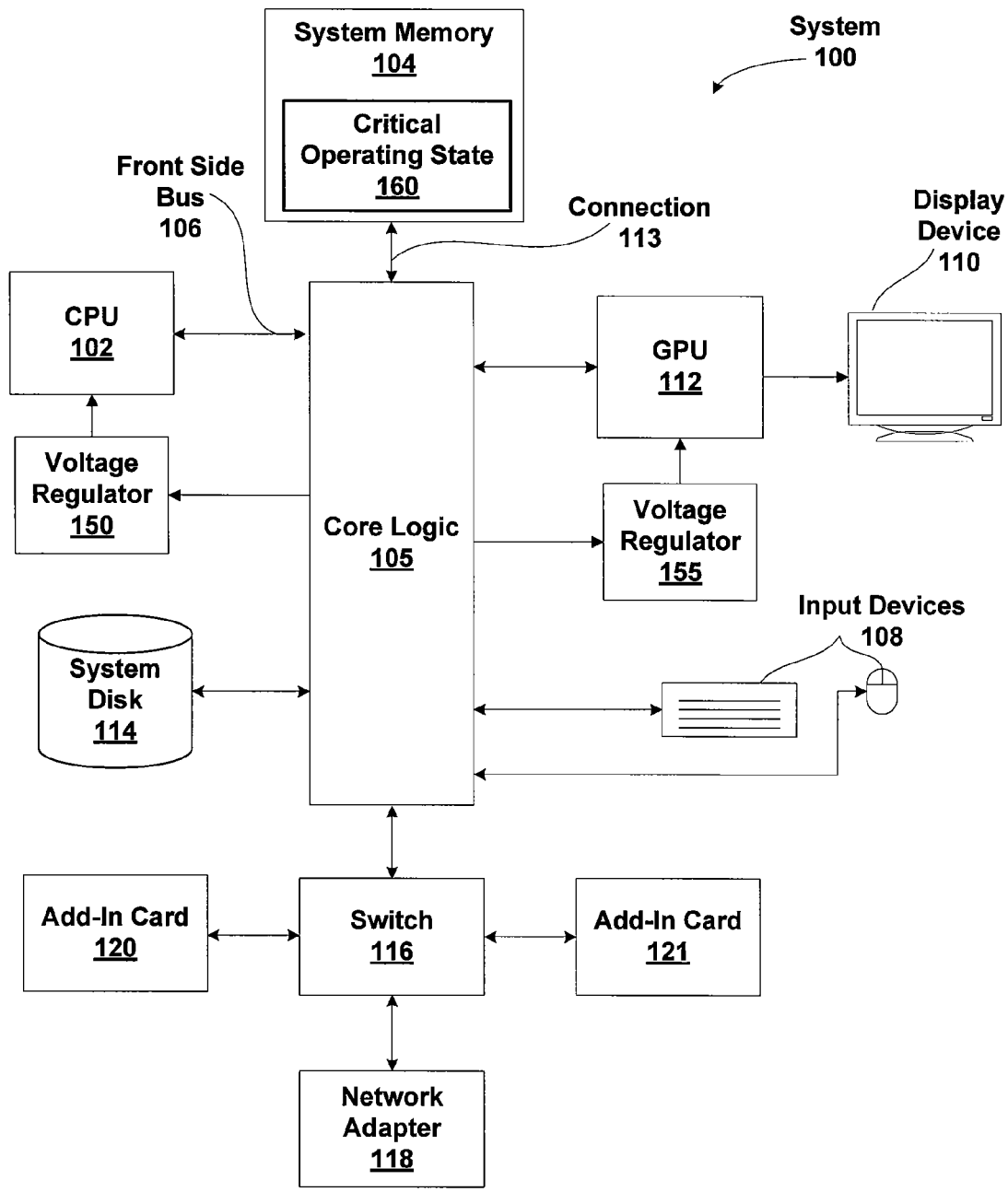
FIGS. 1A and 1B are block diagrams illustrating a computer system configured to implement one or more aspects of the present invention.

FIG. 1A is a block diagram illustrating a computer system 100 configured to implement one or more aspects of the present invention. Computer system 100 is a hybrid computing platform that includes multiple processing units in order to provide various levels of activities and levels of power consumption. Computer system 100 includes a central processing unit (CPU) 102 and a system memory 104 communicating via a bus path that includes a core logic 105. A critical operating state 160 is stored in system memory 104. Prior transitioning to a low power operating mode, CPU 102 stores critical operating state 160 into system memory 104. Critical operating state 160 may include one or more of an interrupt service routine, a portion of the operating system that is needed to service interrupts and update the cursor position, a minimum device driver, and current display surfaces (pixel image data). In some embodiments of the present invention, critical operating state 160 occupies 64 Kbytes of system memory 104.

Core logic 105 is a bridge device that couples CPU 102 to one or more other devices in the platform and is coupled to system memory 104 via a connection 113. Core logic 105 receives user input from one or more user input devices 108

(e.g., keyboard, mouse) and forwards the input to CPU 102 via path 106. When computer system 100 operates in the low power operating mode, core logic 105 copies critical operating state 160 and updates the copy as needed. While in the low power operating mode, core logic 105 configures CPU 102 to remain in a powered off state by controlling the voltage input to CPU 102 through voltage regulator 150. Core logic 105 then intercepts and processes interrupts for CPU 102, allowing CPU 102 to remain powered off.

Computer system 100 can optionally include a GPU 112 and a voltage regulator 155. GPU 112 is coupled to core logic 105 via a bus or other communication path (e.g., a PCI Express, Accelerated Graphics Port, or HyperTransport link); in one embodiment GPU 112 is a graphics subsystem that delivers pixels to display device 110. A device driver may be stored in system memory 104, to interface between processes executed by CPU 102, such as application programs, and GPU 112, translating program instructions as needed for execution by GPU 112. A minimum device driver may be included in critical operating state 160. While in the low power operating mode, core logic 105 may configure GPU 112 to enter a powered off state by controlling the voltage input to GPU 112 through voltage regulator 155. Similarly, core logic 105 may configure system memory 104 to enter a powered off state by controlling a voltage input through another voltage regulator (not shown). Core logic 105 also reapplies normal operating voltages to CPU 102 and GPU 112 through voltage regulators 150 and 155, respectively.

Core logic 105 is coupled to a display device 110 (e.g., a conventional CRT or LCD based monitor). A system disk 114 is also connected to core logic 105. A switch 116 provides connections between core logic 105 and other components such as a network adapter 118 and various add-in cards 120 and 121. Other components (not explicitly shown), including USB or other port connections, CD drives, DVD drives, film recording devices, and the like, may also be connected to core logic 105. Communication paths interconnecting the various components in FIG. 1A may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Figure 1B:
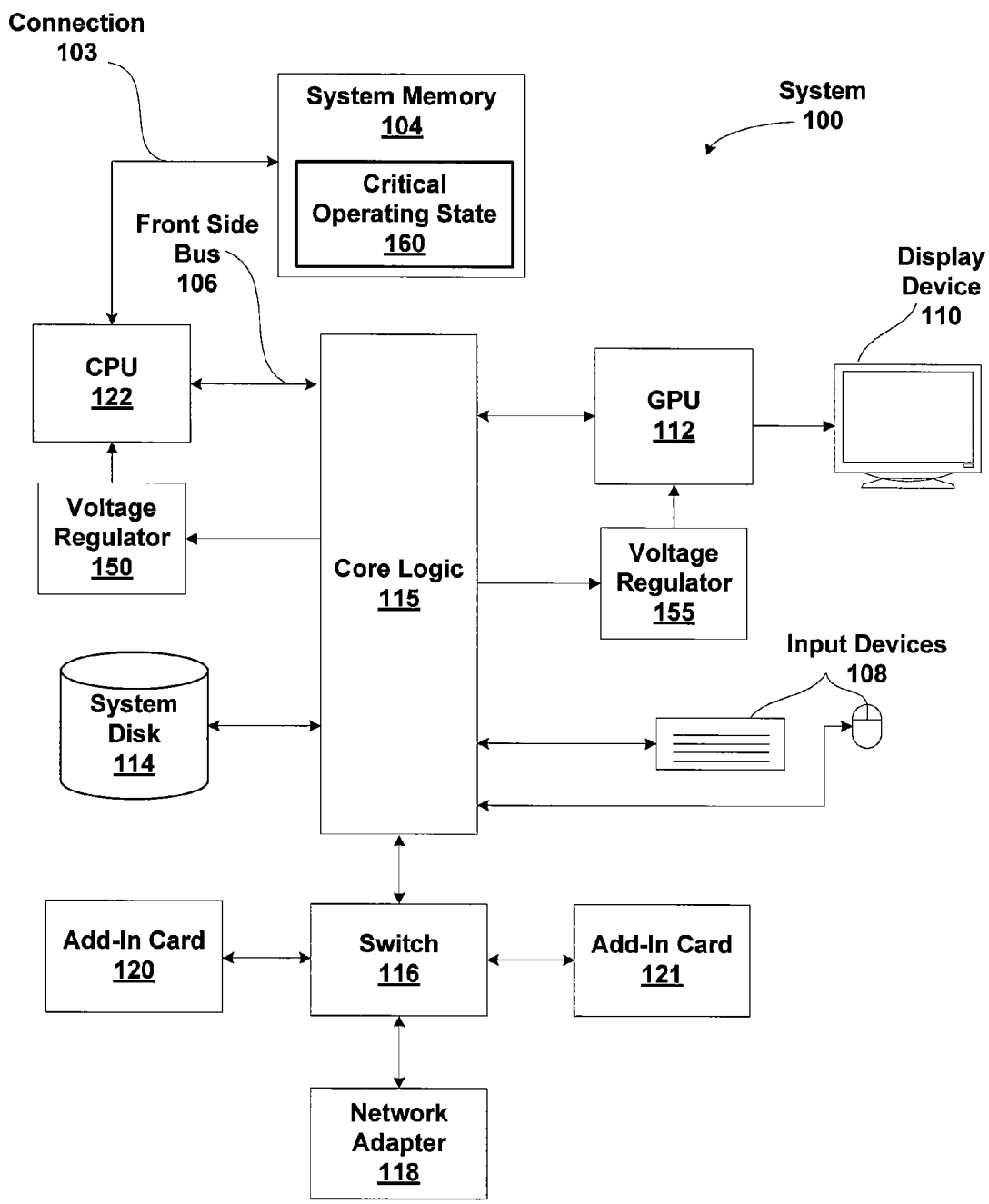

FIG. 1B is another block diagram illustrating a computer system 100 configured to implement one or more aspects of the present invention. In contrast with FIG. 1A, system memory 104 is connected to a CPU 122 directly via connection 103 rather than through a core logic 115, and other devices communicate with system memory 104 via core logic 115 and CPU 122.

It will be appreciated that the system shown herein is illustrative and that variations and modifications are possible. The connection topology, including the number and arrangement of bridges, may be modified as desired. In other alternative topologies, GPU 112 is connected directly to CPU 102 or CPU 122, rather than to core logic 105 or core logic 115. In still other embodiments, core logic 105 or core logic 115 may be separated into a multiple chips. The particular components shown herein are optional; for instance, any number of add-in cards or peripheral devices might be supported. In some embodiments, switch 116 is eliminated, and network adapter 118 and add-in cards 120, 121 connect directly to core logic 105 or core logic 115.

The connection of GPU 112 to the rest of system 100 may also be varied. In some embodiments, GPU 112 is implemented as an add-in card that can be inserted into an expansion slot of system 100. In other embodiments, a GPU 112 can be integrated on a single chip with core logic 105 or core logic 115. In still other embodiments, some or all elements of GPU 112 may be integrated on a single chip with CPU 102 or CPU 122.

Core Logic Overview

Figure 2A:
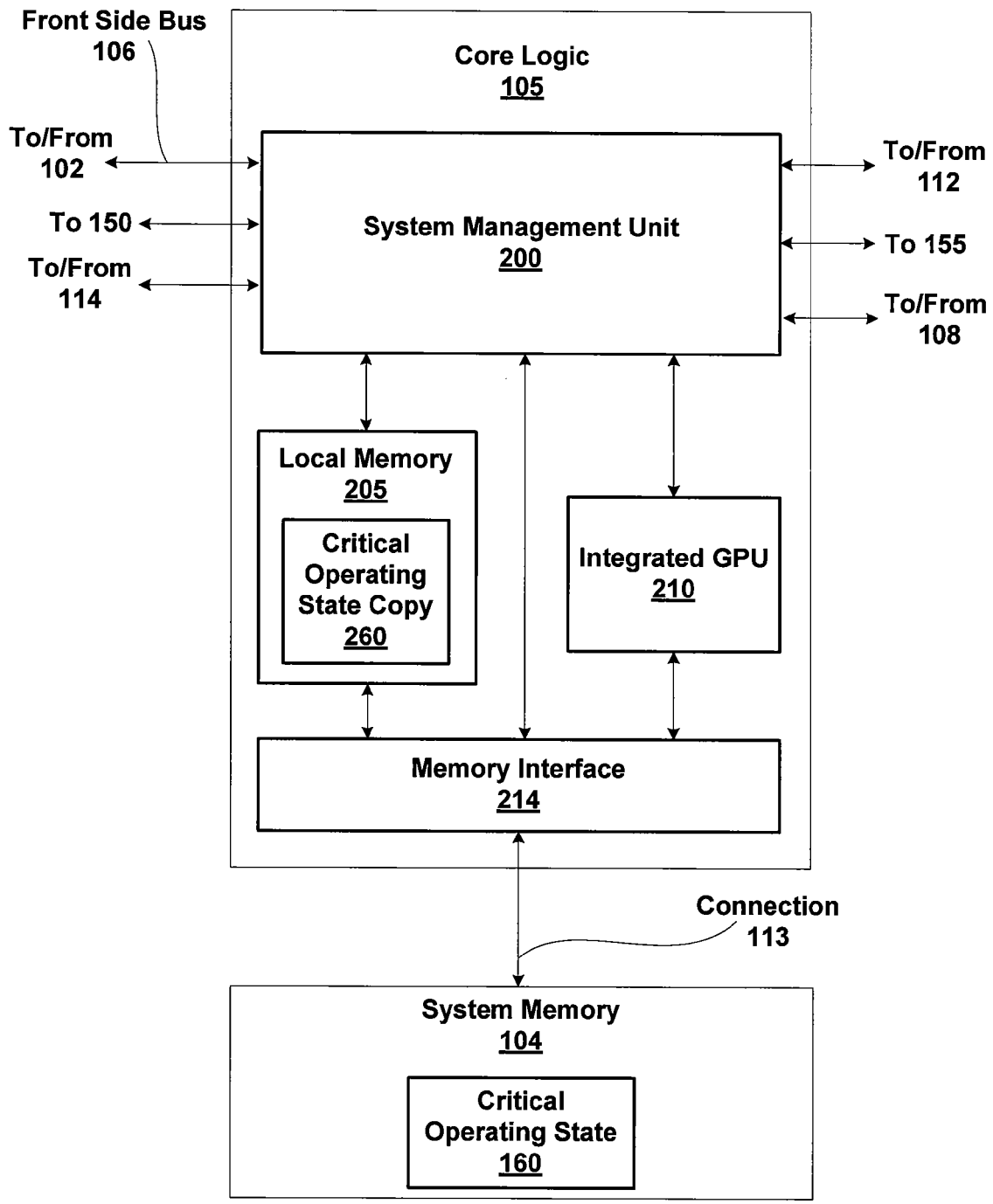
FIGS. 2A and 2B are block diagrams of core logic for the computer system of FIGS. 1A and 1B, respectively, in accordance with one or more aspects of the present invention.
Figure 2B:
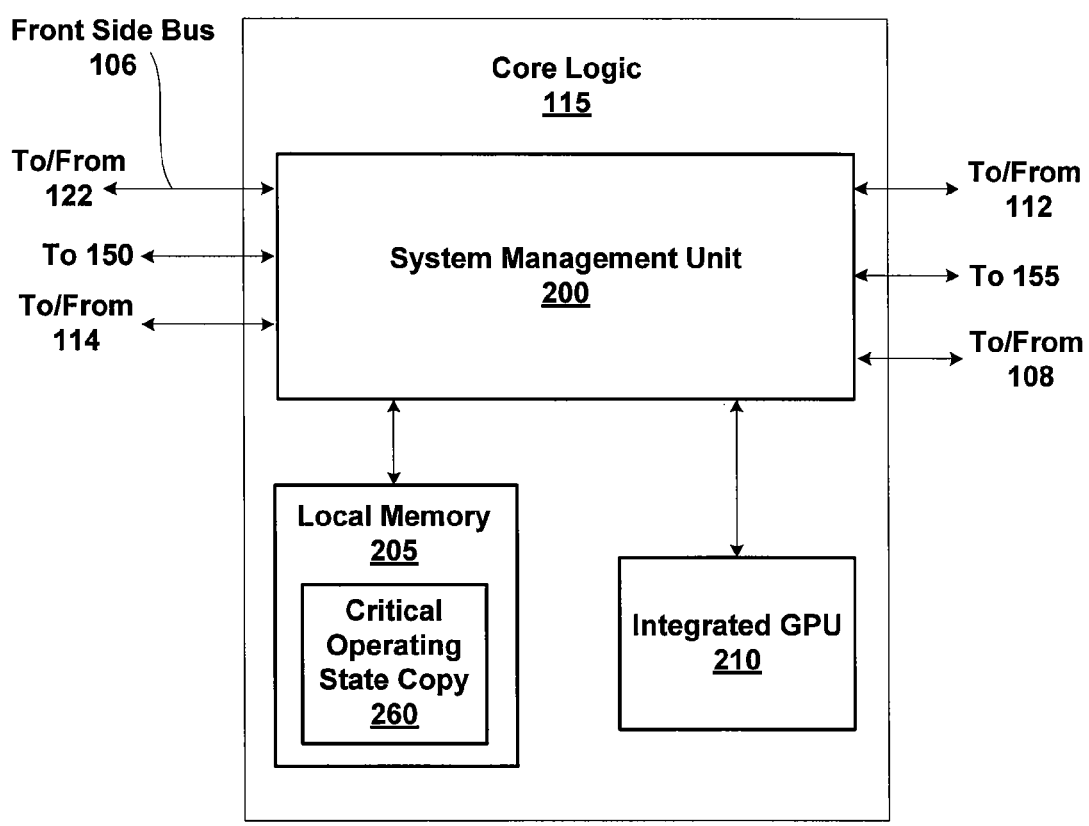

FIG. 2A is a block diagram of core logic 105 for the computer system 100 of FIG. 1A, in accordance with one or more aspects of the present invention. FIG. 2B is a block diagram of core logic 115 for the computer system 100 of FIG. 1B, in accordance with one or more aspects of the present invention. Core logic 105 and core logic 115 each include a system management unit 200 that may be an embedded low power processor such as an ARM (advanced reduced instruction set machine), PowerPC, or the like. System management unit 200 consumes less power than CPU 102 or CPU 122 and may be configured to perform at least a portion of the processing performed by CPU 102 or CPU 122. In the preferred embodiment of the present invention, system management unit 200 is configured to perform the portion of processing needed to service system interrupts.

Core logic 105 and core logic 115 each also include a local memory 205 that is configured to load a copy of critical operating state 160 from system memory 104 to produce critical operating state copy 260. When the topology shown in FIG. 1B is used, critical operating state 160 is copied from system memory 104 through CPU 122 and connection 103. On-chip SRAM, on-chip embedded DRAM, off-chip DRAM, or the like, can be used to construct local memory 205. Local memory 205 and system memory 104 can be the same physical entity when system memory 104 is connected to core logic 105 directly, as shown in FIG. 1A. During the processing of intercepted interrupts, system management unit 200 may modify critical operating state copy 260. For example, a return program counter may be updated and values of stack pointers and other system registers may be changed. The modifications made by system management unit 200 to critical operating state copy 260 during a low power mode are equivalent to those that would be made to critical operating state 160 by CPU 102 or CPU 122, if computer system 100 were operating at a higher activity level. When computer system 100 transitions from a low power operating mode to a high power operating mode, critical operating state copy 260 is written to system memory 104 to update critical operating state 160. CPU 102 or CPU 122 then resumes processing using the current critical operating state instead of the outdated critical operating state that was originally stored by CPU 102 or CPU 122 when CPU 102 or CPU 122 was powered down for the transition into the low power operating mode.

System management unit 200 is configured to determine when computer system 100 should enter and exit the low power operating mode. System management unit 200 is configured to power CPU 102 or CPU 122 up or down by enabling and disabling voltage regulator 150. Similarly, system management unit 200 is configured to power GPU 112 up or down by enabling and disabling voltage regulator 155. As previously described, system management unit 200 may also be configured to power down other components within computer system 100, such as system memory 104.

In some embodiments of the present invention, core logic 105 includes a memory interface 214 that is used to interface with system memory 104. System management unit 200 provides computer system 100 with a hybrid processing capability since both system management unit 200 and CPU 102 or CPU 122 may be enabled, and CPU 102 or CPU 122 may be disabled while system management unit 200 is enabled.

Idle-Time Processing

Figure 3:
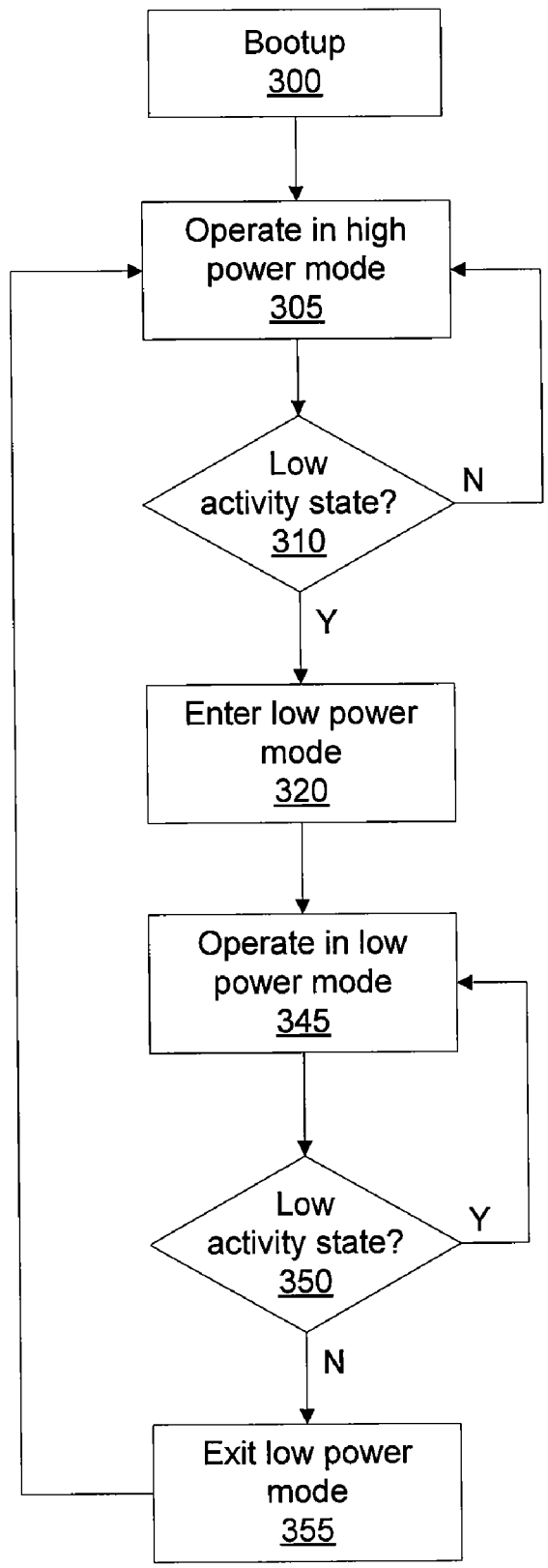
FIG. 3 is a flow diagram of method steps for transitioning between a high power mode and a low power mode in accordance with one or more aspects of the present invention.

FIG. 3 is a flow diagram of method steps for transitioning between a high power mode and a low power mode, in accordance with one or more aspects of the present invention. In step 300 computer system 100 is booted up and CPU 102 and core logic 105 are both powered up or CPU 122 and core logic 115 are both powered up. An example bootup sequence is described in conjunction with FIG. 6.

In step 305 computer system 100 operates in a high power mode. In step 310 system management unit 200 determines if computer system 100 is in a low activity state. A low activity state occurs when no activity is present or when the frequency of system interrupts falls below a minimum threshold. A system activity timer may be used to determine if the delays between interrupts constitute a low activity state. In some embodiments of the present invention, an operating system determines whether or not computer system 100 is in a low activity state. If, in step 310 a low activity state is not detected, then in step 305 computer system 100 continues to operate in the high power mode. Otherwise, in step 320 computer system 100 enters a low power mode, as described in detail in conjunction with FIGS. 4A, 4B, and 4C.

In step 350 system management unit 200 determines if computer system 100 remains in the low activity state, and, if so, computer system 100 returns to step 345 to continue operating in the low power mode. Otherwise, in step 355 computer system 100 exits the low power mode, as described in detail in conjunction with FIG. 5, and returns to step 305 to transition from the low power mode to the high power mode. System management unit 200 or the operating system may determine that the activity level has increased, necessitating the transition from the low power mode to a higher power mode when the interrupt frequency increases or when critical operating state copy 260 is insufficient to service the interrupts that are intercepted.

Figure 4A:
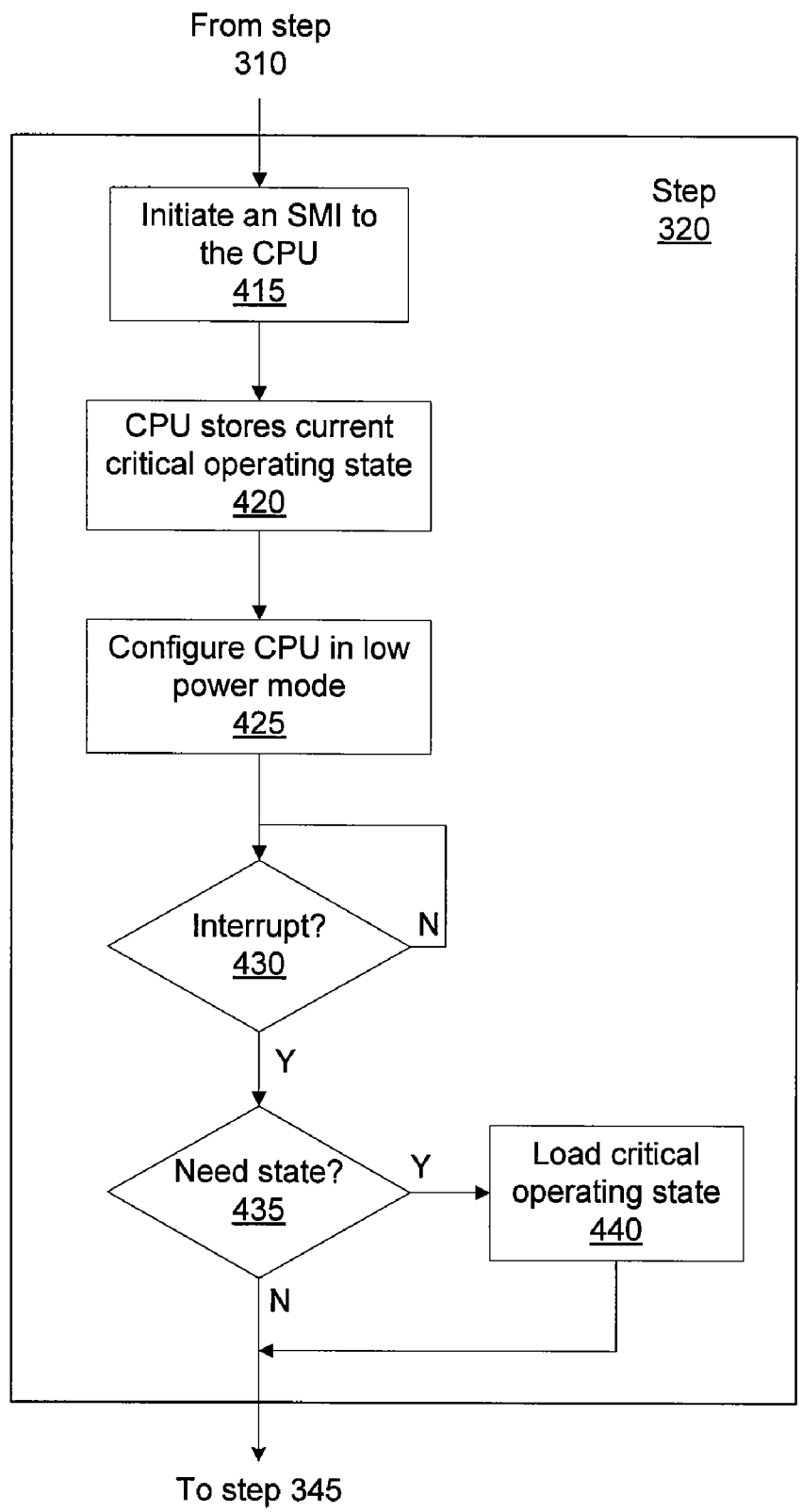
FIGS. 4A, 4B, and 4C are flow diagrams of method steps for entering the low power mode in accordance with one or more aspects of the present invention.

FIG. 4A is a flow diagram of method steps for performing step 320 of FIG. 3, in accordance with one or more aspects of the present invention. In step 415 system management unit initiates a system management interrupt (SMI) to CPU 102 or CPU 122 indicating that computer system 100 will transition to the low power operating state. In step 420, CPU 102 or CPU 122 stores the current critical operating state 160 in system memory 104. When CPU 102 or CPU 122 may store a portion of the critical operating state in a cache within CPU 102 or CPU 122, the contents of the cache are written to system memory 104 (i.e., the cache is flushed) to ensure that current critical operating state 160 is accurate.

In step 425, system management unit 200 configures CPU 102 or CPU 122 to operate in a low power mode by disabling voltage regulator 150. In the low power operating mode system management unit 200 intercepts system interrupts for processing rather than passing the system interrupts to CPU 102 or CPU 122. In step 430 system management unit 200 determines if an intercepted system interrupt is received, and, if not, system management unit 200 waits to intercept a system interrupt. When a system interrupt is intercepted, system management unit 200 proceeds to step 435 and determines if a portion of critical operating state 160 needed to process the interrupt is not present in critical operating state 160, and, if so, then in step 440 system management unit 200 copies at least a portion of critical operating state 160 to critical operating state copy 260. In a preferred embodiment of the present invention, CPU 102 or CPU 122 is configured to copy critical operating state 160 to local memory 205 in system management unit 200 in addition to system memory 104. In other embodiments of the present invention, portions of critical operating state 160 are copied from system memory 104 as needed by system management unit 200. In other embodiments of the present invention, the entire critical operating state 160 is copied by system management unit 200. Note that steps 435 and 440 may be repeated when system management unit 200 only copies portions of critical operating state 160 as needed to process each interrupt.

As previously described, critical operating state 160 includes data that is needed by system management unit 200 to process system interrupts. Critical operating state 160 may include one or more of an interrupt service routine, a portion of the operating system that is needed to service interrupts and update the cursor position, a minimum device driver, and current display surfaces.

Figure 4B:
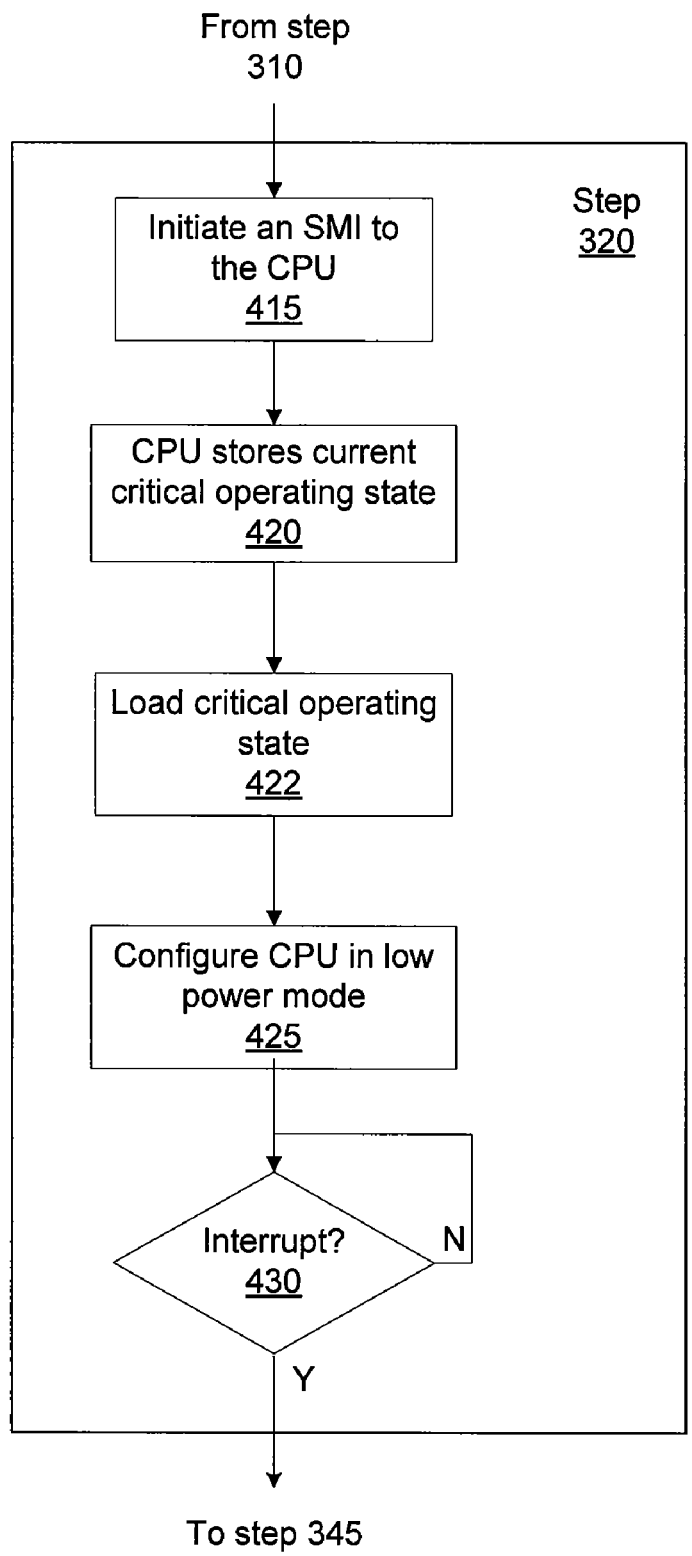

FIG. 4B is another flow diagram of method steps for performing step 320 of FIG. 3, in accordance with one or more aspects of the present invention. Steps 415 and 420 are performed as previously described. In step 422 system management unit 200 copies critical operating state 160 to load critical operating state copy 260 into local memory 205. Rather than copying all or portions of critical operating state 160 after intercepting a system interrupt, the method shown in FIG. 4B proactively loads critical operating state 160 into local memory 205 to produce critical operating state copy 260. Steps 425 and 430 are performed as previously described.

Figure 4C:
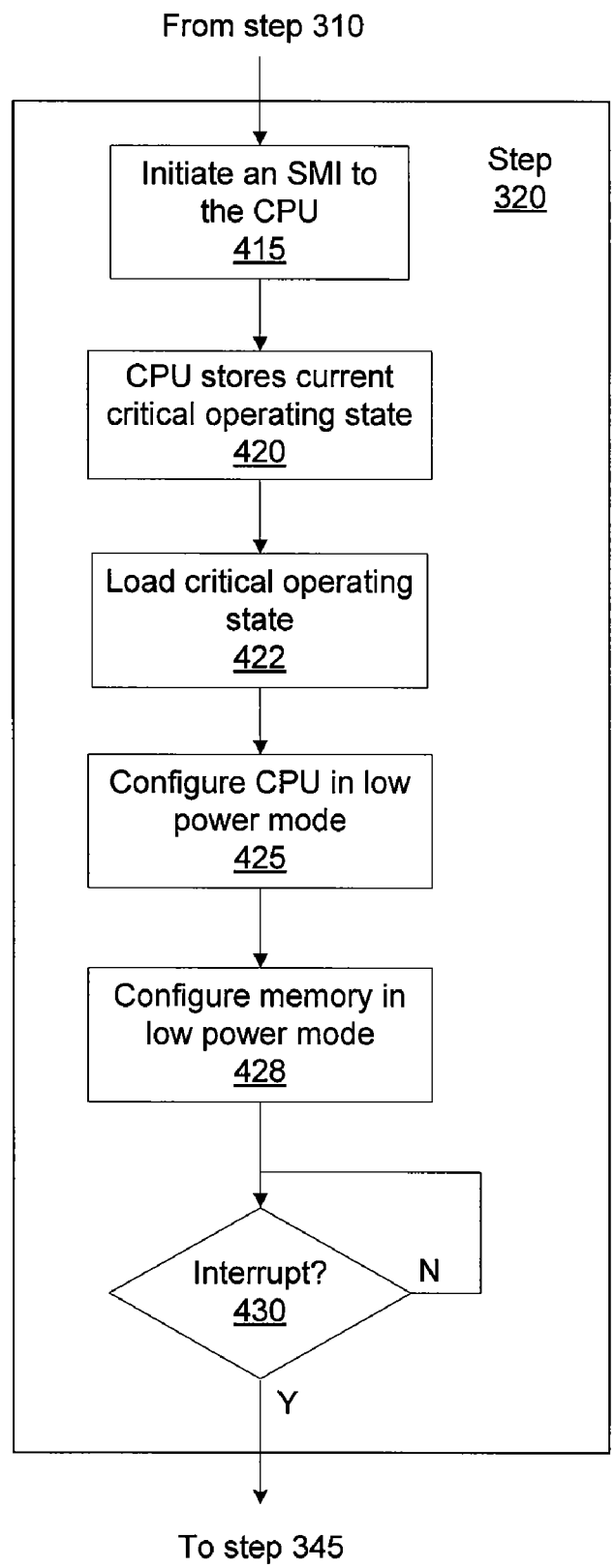

FIG. 4C is yet another flow diagram of method steps for performing step 320 of FIG. 3, in accordance with one or more aspects of the present invention. Steps 415, 420, 422, and 425 are performed as previously described. In step 428, system management unit 200 configures system memory 104 to operate in a low power mode by disabling voltage regulator 155. Removing the power supply to system memory 104 further reduces the power consumed by computer system 100. When computer system 100 transitions from the low power operating mode to the high power operating mode, system management unit 200 may enable voltage regulator 155 to restore power to system memory 104. Step 430 is performed as previously described.

Figure 5:
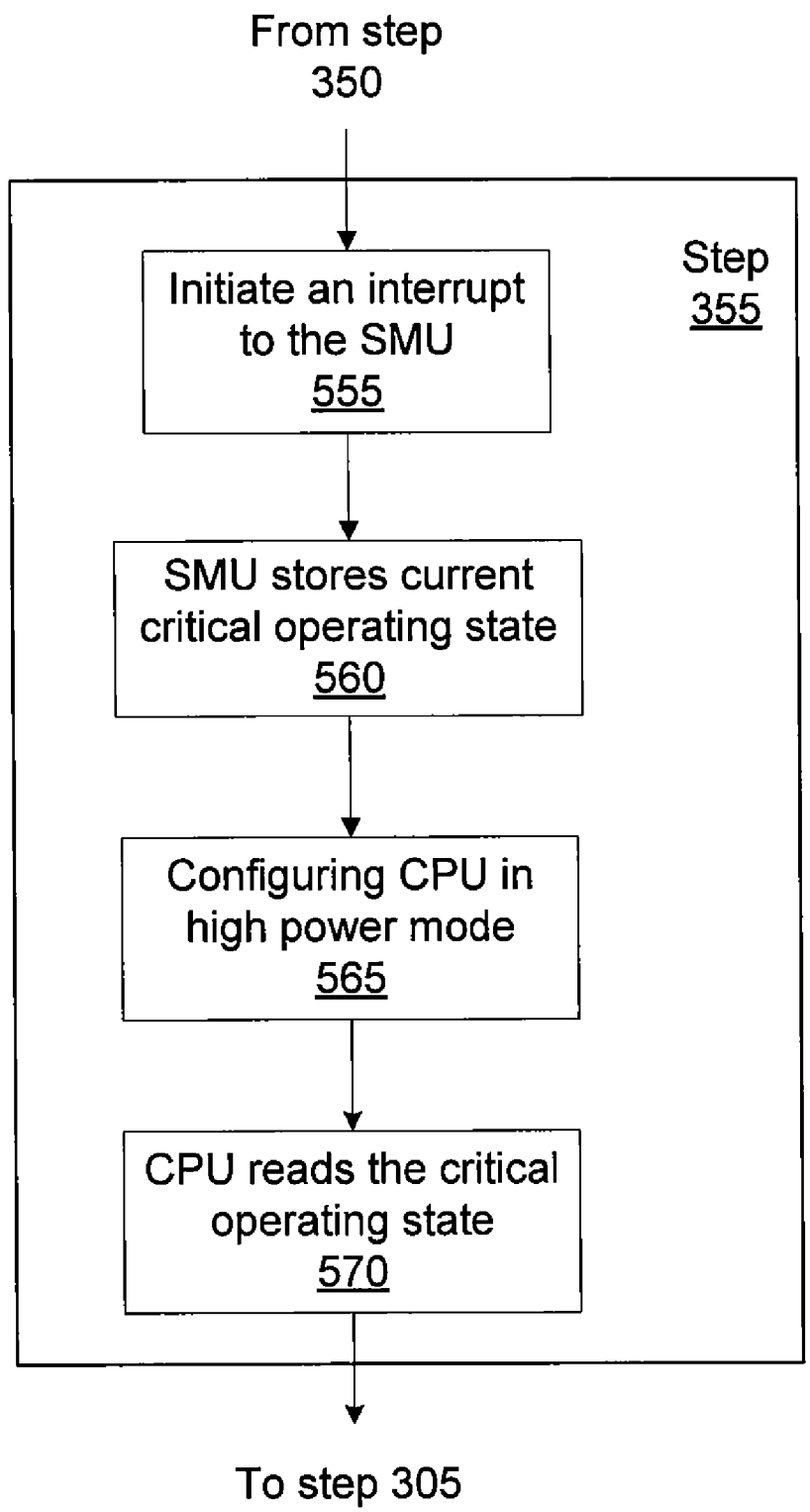
FIG. 5 is a flow diagram of method steps for exiting the low power mode in accordance with one or more aspects of the present invention.

FIG. 5 is a flow diagram of method steps for performing step 355 of FIG. 3 to transition from the low power operating state to the high power operating state, in accordance with one or more aspects of the present invention. In step 555 system management unit 200 initiates an interrupt to itself indicating that computer system 100 is no longer in a low activity state. In step 560 system management unit 200 stores the current critical operating state copy 260 in system memory 104 to update critical operating state 160. In step 565 system management unit 200 configures CPU 102 or CPU 122 to operate in the high power mode. In step 570 CPU 102 or CPU 122 reads critical operating state 160 from system memory 104 and resume processing with the updated critical operating state that was modified by system management unit 200 during the processing of intercepted interrupts.

Figure 6:
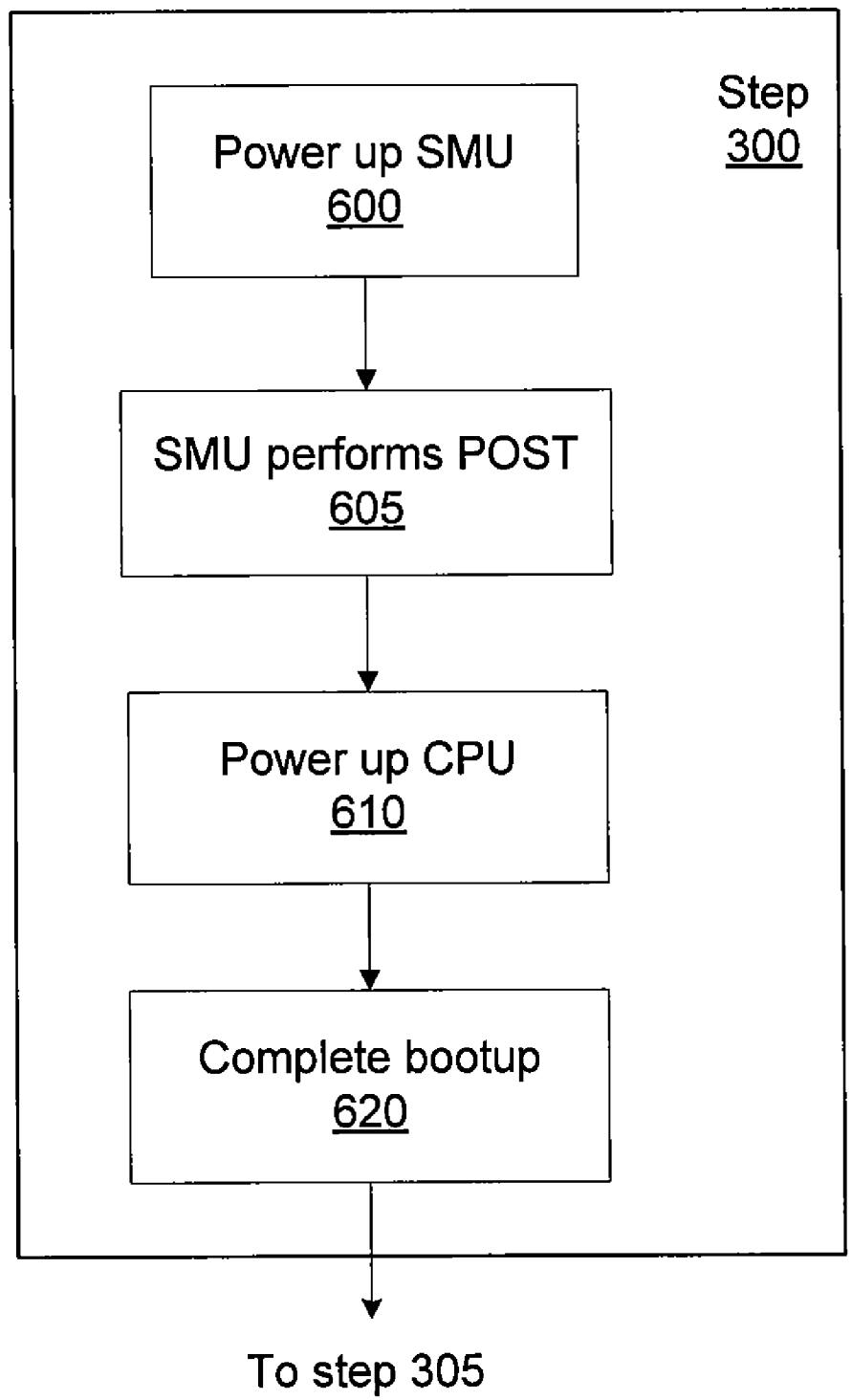
FIG. 6 is a flow diagram of method steps for booting up the computer system of FIGS. 1A and 1B in accordance with one or more aspects of the present invention.

FIG. 6 is a flow diagram of method steps for performing step 300 of FIG. 3 to boot up computer system 100 of FIGS. 1A and 1B, in accordance with one or more aspects of the present invention. In step 600 system management unit 200 is powered up. In step 605 system management unit 200 performs the power on self test (POST) function for computer system 100. In conventional systems the POST is performed by the high performance CPU. Using system management unit 200 to perform the POST reduces the power that is consumed. In step 610 CPU 102 or CPU 122 is powered up and in step 620 the bootup process is completed. In some embodiments of the present invention, step 610 is delayed until an application program is loaded in order to reduce the power consumption during the bootup process.

In some embodiments of the present invention the operating system adaptively migrates processing tasks to the various processing units, e.g., CPU 102 or CPU 122, GPU 112, system management unit 200, and low power GPU 210, within the heterogeneous computing platform based on performance and/or power constraints. When system activity is low, the operating system can initiate a transition to the low power operating state by first migrating a critical processes onto system management unit 200 and powering down CPU 102 or CPU 122 once all critical processes have be migrated off of CPU 102 or CPU 122.

Adaptively transitioning computing system 100 between operating modes that have different power consumption characteristics may extend the time that computing system 100 operates on battery power. System management unit 200 or the operating system may determine when computer system 100 should transition between the different power modes. In the low power mode system management unit 200 intercepts and processes interrupts intended for the CPU 102 or CPU 122 while updating a copy of the critical operating state. When the level of activity changes, CPU 102 or CPU 122 resumes processing of interrupts using the critical operating state that was modified by system management unit 200. Various power consumption levels may be achieved by enabling or disabling power to CPU 102 or CPU 122, system management unit 200, GPU 112, and system memory 104.

The invention has been described above with reference to specific embodiments. Persons skilled in the art, however, will understand that various modifications and changes may be made thereto without departing from the broader spirit and scope of the invention as set forth in the appended claims. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The foregoing description and drawings are, accordingly, to be regarded in an illustrative rather than a restrictive sense.

The invention claimed is:

1. A method for adaptively transitioning a computing system between operating modes that have different power consumption, the method comprising:
   determining that the computing system is in a low activity state;
   initiating a system management interrupt to a central processing unit (CPU) in the computing system;
   storing critical operating state of the CPU in a system memory, wherein the critical operating state of the CPU includes at least one of pixel image data, an interrupt service routine, and a portion of an operating system;
   configuring the CPU in a low power operating mode; and
   intercepting interrupts intended for the CPU for processing by a system management unit (SMU).

2. The method of claim 1, further comprising the step of loading the critical operating state of the CPU from the system memory to the SMU to produce a copy of the critical operating state that is modified as a result of the processing of the interrupts by the SMU.

3. The method of claim 2, further comprising, the steps of:
   determining that the computing system is not in a low activity state; and
   generating an interrupt, by the SMU, for the SMU to initiate a transition from a low power operating mode to a high power operating mode.

4. The method of claim 3, further comprising, the step of storing the copy of the critical operating state from the SMU to the system memory to update the critical operating state.

5. The method of claim 4, further comprising the steps of:
   reading, by the CPU, the critical operating state from the system memory; and
   configuring the CPU to operate in the high power operating mode.

6. The method of claim 1, further comprising the steps of:
   determining that a portion of the critical operating state of the CPU that is needed by the SMU to process an intercepted interrupt is not stored in the SMU; and
   loading the portion of the critical operating state of the CPU from the system memory to the SMU.

7. The method of claim 1, wherein the interrupts intended for the CPU include at least one of an interrupt from an input device, a periodic system update, and a periodic universal serial bus cycle.

8. The method of claim 1, further comprising the step of configuring the system memory in a low power operating mode.

9. The method of claim 1, further comprising, prior to the step of determining that the computing system is in a low activity state, the steps of:
   powering up the SMU; and
   performing a power up and self test sequence before powering up the CPU.

10. A computing device configured to adaptively transition a computing system between operating modes that have different power consumptions, the computing device comprising:
    a central processing unit (CPU) configurable to operate in a low power operating mode and a high power operating mode;
    a system memory configured to store critical operating state; and
    a system management unit (SMU) that is coupled to the CPU, and configured to:
      initiate a system management interrupt to the CPU when the computing system is in a low activity state;
      store the critical operating state of the CPU in the system memory, wherein the critical operating state of the CPU includes at least one of pixel image data, an interrupt service routine, and a portion of an operating system;
    configure the CPU in the low power operating mode; and
    intercept interrupts intended for the CPU for processing.

11. The computing device of claim 10, wherein the SMU is further configured to load the critical operating state from the system memory, before intercepting the interrupts, to produce a copy of the critical operating state that is stored in the SMU and modified as a result of the processing of the interrupts by the SMU.

12. The computing device of claim 11, wherein the SMU is further configured to generate an interrupt for the SMU to initiate a transition from a low power operating mode to a high power operating mode when the computing system transitions from a low activity state to a high activity state.

13. The computing device of claim 12, wherein the SMU is further configured to store the copy of the critical operating state to the system memory to update the critical operating state.

14. The computing device of claim 13, wherein the CPU is further configured to read the critical operating state when configured by the SMU to transition from the low power operating mode to the high power operating mode.

15. The computing device of claim 10, wherein the SMU is further configured to load a portion of the critical operating state of the CPU from the system memory to the SMU when the portion of the critical operating state of the CPU is needed to process an intercepted interrupt.

16. The computing device of claim 10, wherein the interrupts intended for the CPU include at least one of an interrupt from an input device, a periodic system update, and a periodic universal serial bus cycle.

17. The computing device of claim 10, wherein the SMU is further configured to configure the system memory in a low power operating mode to transition from the high power operating mode to the low power operating mode.

18. The computing device of claim 10, wherein the SMU is further configured to perform a power up and self test sequence before the CPU is powered up and enters the high power operating mode.

19. A method for adaptively transitioning a computing system between operating modes that have different power consumption, the method comprising:

powering up a system management unit (SMU);

performing a power up and self test sequence before powering up a central processing unit (CPU) in the computing system;

determining that the computing system is in a low activity state;

initiating a system management interrupt to the CPU in the computing system;

storing critical operating state of the CPU in a system memory;

configuring the CPU in a low power operating mode; and intercepting interrupts intended for the CPU for processing by the SMU.

20. A computing device configured to adaptively transition a computing system between operating modes that have different power consumptions, the computing device comprising:

a central processing unit (CPU) configurable to operate in a low power operating mode and a high power operating mode;

a system memory configured to store critical operating state; and a system management unit (SMU) that is coupled to the CPU, and configured to:

perform a power up and self test sequence before the CPU is powered up and enters the high power operating mode;

initiate a system management interrupt to the CPU when the computing system is in a low activity state;

store the critical operating state of the CPU in the system memory;

configure the CPU in the low power operating mode; and intercept interrupts intended for the CPU for processing.

* * * * *